United States Patent [19]

Makos et al.

[11] 4,405,275
[45] Sep. 20, 1983

[54] UNLOADING APPARATUS FOR LOG BATCH FORMER

[75] Inventors: Ronald A. Makos; James W. Young, both of Grays Harbor County, Wash.

[73] Assignee: Enterprises International, Inc., Olympia, Wash.

[21] Appl. No.: 288,992

[22] Filed: Jul. 31, 1981

[51] Int. Cl.³ ............................................. B65G 57/02
[52] U.S. Cl. ...................................... 414/28; 414/43; 414/145; 414/786
[58] Field of Search ................... 414/43, 46, 287, 293, 414/626, 745, 748, 28

[56] References Cited

U.S. PATENT DOCUMENTS 2,166,609  7/1939  Putnam ................................ 414/745
3,785,506  1/1974  Crocker et al. ..................... 414/745
4,079,844  3/1978  Whitaker et al. ..................... 414/48

FOREIGN PATENT DOCUMENTS 2456063  1/1981  France .................................. 414/43

Primary Examiner—Robert J. Spar
Assistant Examiner—Ken Muncy
Attorney, Agent, or Firm—Seed, Berry, Vernon & Baynham

[57] ABSTRACT

A log unloading apparatus for a batch former in which a receiver platen is moved by a batch of logs as they are pushed out of the batch former. The logs are supported intermediate their lengths by an intermediate log support member which initially is abutting the batch former, but, upon movement of the logs from the batch former, can be drawn out with the receiver platen to provide support for the logs intermediate their length but also providing two spaces or gaps sufficient to receive the forked tines of a grapple.

10 Claims, 5 Drawing Figures

UNLOADING APPARATUS FOR LOG BATCH FORMER

DESCRIPTION

1. Technical Field

This invention pertains a log batch formers for preparation of logs to deliver to a log grinder, and more particularly, to an unloading apparatus for such batch formers.

2. Background Art

Batch formers for wood grinders are well known. One particular type of batch former is shown in U.S. Pat. No. 4,079,844. Many grinding facilities, such as pulp mills, frequently are handling log lengths 36 inches or less. If these smaller lengths cannot be handled and fed to the grinder, they must be disposed of in a less valuable form, reducing the income of the pulp mill facility. A typical grinder, for example, can handle over 600 cords of logs per day, so the cost advantage of being able to use smaller size logs is considerable.

The unloading apparatus for the batch former shown in U.S. Pat. No. 4,079,844 uses a grapple with a solid body. The size of the opening to accommodate the grapple for removing logs from the batch loader, with clearance necessary, takes a considerable length (e.g., 26 inches). The unloading apparatus also uses a movable receiver platen which is moved by the logs as they are pushed from the batch unloader by a pusher platen. The difficulty, however, is that the size of the large opening to accommodate the grapple between the receiver platen and the bottom floor of the batch former creates a considerable gap such that skewed logs 36 inches in length, or smaller logs, will frequently fall through the gap or become jammed in the gap.

DISCLOSURE OF INVENTION

It is therefore an object of this invention to provide an unloading apparatus for a batch former which can accommodate smaller length logs.

It is still another object of this invention to provide an unloading apparatus for a batch former which will support small length logs while being removed by a split or forked grapple.

Basically, these objects are obtained by providing an intermediate log support member which can be nested or abutted between the receiver platen and the downstream end of the floor of the batch former when logs are being initially pushed out of the batch former. The log support member provides a bridge or span to support the logs. The log support member then moves subsequently with the receiver platen to provide additional intermediate support between the receiver platen and the bottom of the batch former while providing sufficient spacing on either side thereof to accommodate the split forks of a grapple unloader.

BEST MODE FOR CARRYING OUT THE INVENTION

Figure 1:
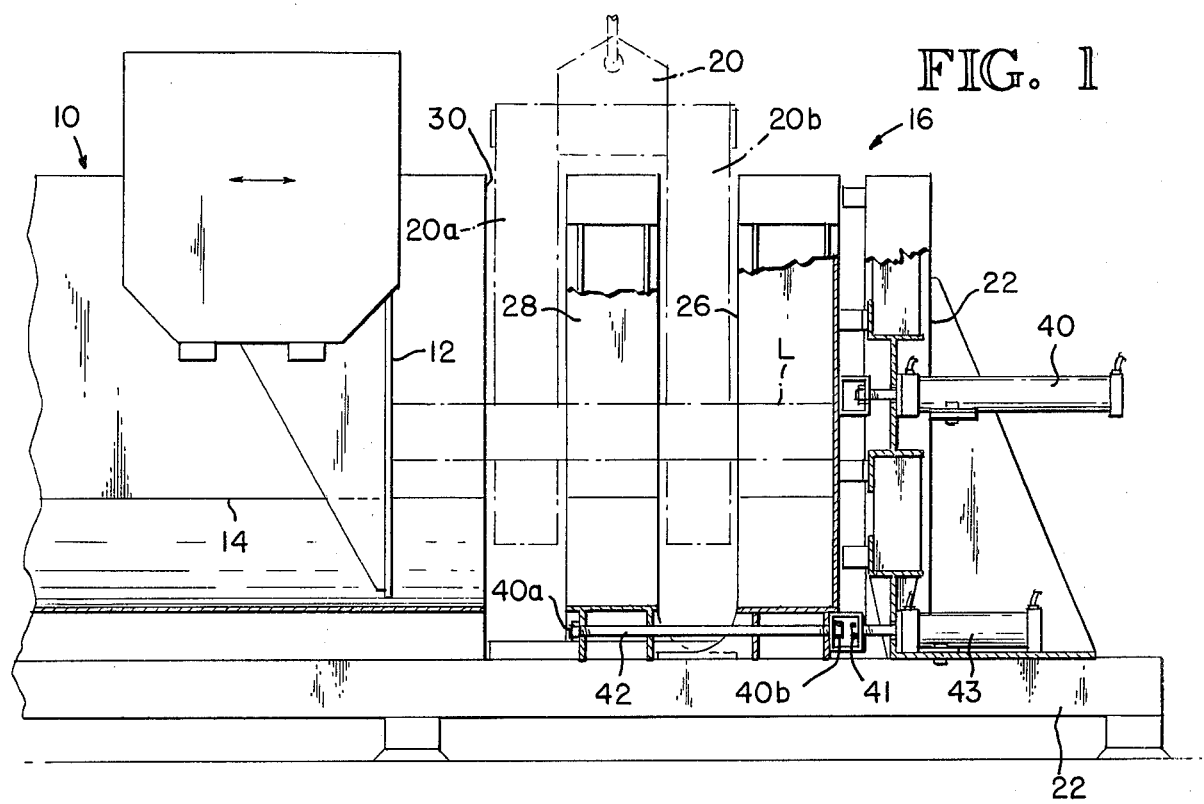
FIG. 1 is a fragmentary side elevation partly in section of an apparatus embodying the principles of the invention.
Figure 2:
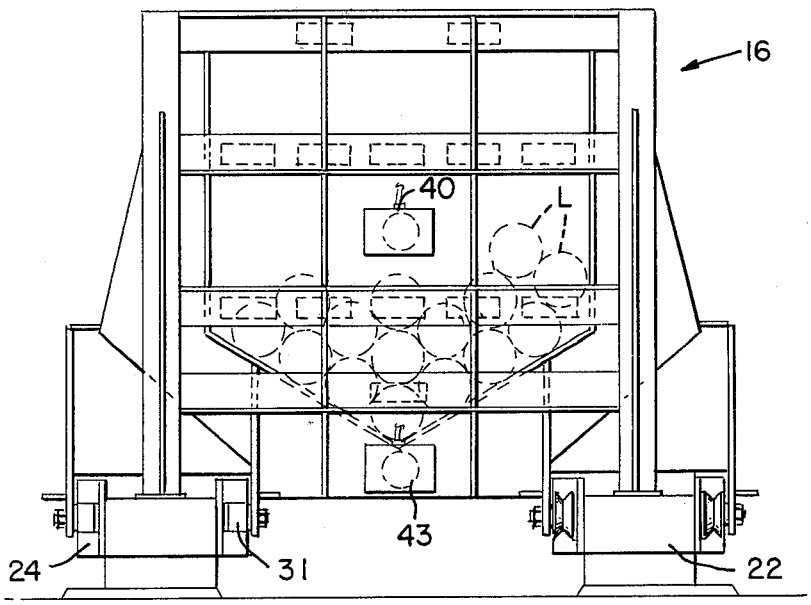
FIG. 2 is an end elevation of the apparatus shown in FIG. 1.

As best shown in FIG. 1, a log batch loader 10 of the type shown in U.S. Pat. No. 4,079,844 is illustrated having a push platen 12 reciprocably mounted in the batch loader. The batch loader receives precut lengths of logs L, lowers them into a batch on a floor 14, and then the pusher platen 12 pushes the batch of logs endwise to an unloading station or apparatus 16. The details of the batch loader are disclosed in U.S. Pat. No. 4,079,844, which is hereby incorporated herein by reference thereto.

In the patent, the batch loader floor is lowered and raised by a cylinder which swings the loader floor about a horizontal pivot. In the embodiment illustrated in this application, a suitable vertically reciprocal cylinder is provided to raise and lower the floor 14. As is well understood, the floor is initially raised to receive the oncoming logs from a conveyor; and, as the batch of logs increases in size, the floor is lowered until it is at the level desired for moving the batch of logs from the batch loader 10 into the unloading apparatus 16.

A grapple 20 having a pair of forked tines 20a and 20b positioned over the unloading apparatus. The unloading apparatus is provided with a main frame 22 having sets of roller guides 24. The roller guides support a receiver platen 26 and an intermediate log support member 28. The receiver platen 26 and log support member 28 are provided with rollers 31 which rotatably support the platen and support for horizontal reciprocal movement on the frame 22.

The log support member 28 and receiver platen 26 are mounted for movement into engagement with the rear edge 30 of the batch loader 10. When pushed together, the log support member 28 and receiver platen 26 provide a relatively smooth, solid surface to guide the oncoming logs that are moving endwise out of the batch loader. That is, the abutting horizontal surfaces of the floor 14, log support member 28 and receiver platen 26 ar flush with one another to give a smooth surface to avoid catching protruding knots or the ends of the logs. As the logs L hit the end wall of the receiver platen, the force from the pushing platen 12 moves the receiver platen to the right or rearwardly against a pressurized cylinder 40. Air pressure in the cylinder, for example, 60 psi, maintains a loading on the forward ends of the logs to keep them squeezed or contained as they are being moved.

The log support 28 and receiver platen 26 are joined by a lost-motion link 42. The link is fastened to the log support member 28 as at 40a and fastened to a block 41 as at 40b. A second cylinder 43 of a lesser air pressure, for example, 20 psi, is connected to the block 41 to provide a spring pressure resisting movement to the right of the log support member 28. Receiver platen 26 can slide freely along the link 42, as is best shown in FIG. 1.

Figure 3A:
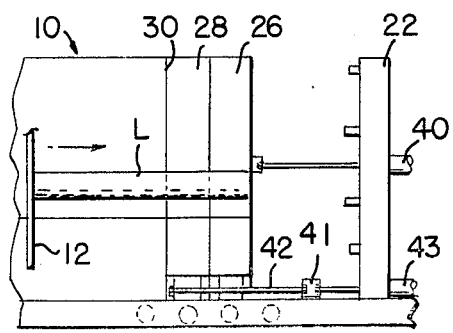
FIGS. 3A–3C are operational schematic views illustrating the principles of the invention.
Figure 3B:
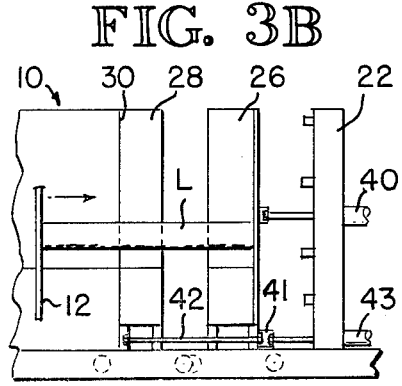

The operational schematics 3A–3C best illustrate the operation of the apparatus. As best shown in FIG. 3A, logs L engage the receiver platen 26 and begin to move the platen to the right. Next, the logs are moved further by the pusher platen 12 so that the receiver platen 26 is moved to its position shown in FIG. 3B, where it engages the block 41 of the link 42. Further movement of the logs then causes the receiver platen 26 to move the intermediate log support member 28 along with the receiver platen, overcoming the cylinder 43 to separate the platen from the rear edge 30 of the batch loader 10. This provides two separation zones sufficient to receive the fork tines 20a and 20b of the grapple 20. The cylinder 43 will resist movement of the log support 28 (to maintain the flush surfaces) until the platen engages the block 41 on the link 42. It should be understood, of course, that the air or hydraulic pressure provided to push the pusher platen 12 is greatly in excess of that pressure maintained by the two cylinders 40 and 43.

Figure 3C:
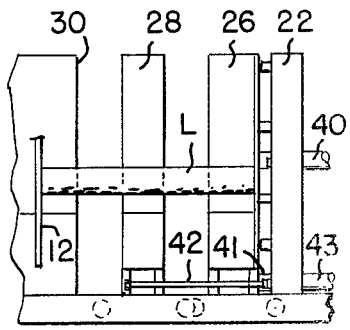

After the platen 26 and intermediate log support member 28 are moved into the positions shown in FIG. 3C, the ends of the logs will still be nested within the forks 20a and 20b, regardless of whether the logs are of sufficient length to span between the rearward edge 30 of the batch loader and the receiver platen. It is only necessary that the logs be of a length sufficient to reach the fork 20a to be lifted by the grapple for subsequent discharge to a grinder, as shown in U.S. Pat. No. 4,079,844.

While the preferred embodiment of the invention has been illustrated and described, it should be understood that variations will be apparent to one skilled in the art without departing from the principles herein. Accordingly, the invention is not to be limited to the specific form illustrated in the drawing.

We claim:

1. A batch former comprising:
a forming compartment for collecting a batch of logs, the compartment having an open end;
pusher means for pushing the batch of logs endwise through said open end out of said compartment;
unloading apparatus adjacent said open end for receiving said batch of logs, said unloading apparatus including:
 (a) a movable receiver platen engageable by said logs, having a surface for supporting the logs, and being movable from a first position adjacent a log support member to a second position spaced from said member, and
 (b) an intermediate log support member positionable between said compartment and said receiver platen, having a surface for supporting the logs, being movable from a first position adjacent said compartment between said receiver platen and said compartment to a second position spaced from both said compartment and said receiver platen by gaps; and
means for returning the log support member and receiver platen to their respective first positions,
wherein (1) the pusher means pushes the logs to engage the receiver platen so that initially only the platen moves away from the log support member as the logs move from the compartment, (2) the log support member moves away from the compartment after the platen has moved a predetermined distance and (3) the logs slide over the surface of the log support member when only the platen is moving.

2. The batch former of claim 1, wherein said unloading apparatus further includes an overhead grapple having tines, spaced lengthwise of said logs, said tines being positionable within gaps between the compartment and log support member and the log support member and the receiver platen so that the logs may be lifted from said receiver platen and log support member.

3. The batch former of claim 2, wherein said unloading apparatus further includes first means for biasing said receiver platen toward said pusher means at a first pressure, and second means for biasing said log support member toward said pusher means at a pressure less than said first pressure, the second means providing a load on the log support member sufficient to preclude movement of the log support member because of frictional force caused by logs sliding over the log support member.

4. The batch former of claim 3, wherein said log support member and said receiver platen provide a generally smooth surface for receiving the logs when each is in its first position.

5. The batch former of claim 1, wherein said log support member and receiver platen are joined by a lost-motion linkage, so that movement of the receiver platen initially is independent of said log support member and so that movement of the log support member is coupled with the platen, when the log support member moves.

6. A batch former comprising:
(a) a batch forming compartment for collecting logs on a platform;
(b) a pusher associated with the compartment for pushing a batch of logs from an open end of the compartment;
(c) a reciprocating intermediate log support member initially positioned immediately adjacent the open end of the compartment and having a log supporting surface flush with the platform;
(d) a reciprocating platen initially positioned immediately adjacent the intermediate log support member, having a surface flush with the platform and the log supporting surface, and having an end plate against which the pusher slides the logs over the platform, log supporting surface, and surface;
(e) means for controlling movement of the member and platen so that the platen moves away from the member a predetermined distance before the member moves away from the compartment, the means includes a lost-motion linkage to couple the platen to the member and a pneumatic cylinder for providing a biasing force to hold the member until the platen has moved the predetermined distance.

7. The batch former of claim 6 further comprising a forked grapple for removing logs from the log support member and platen after the member and platen have moved away from the compartment, wherein tines of the grapple fit into gaps created between the compartment and member and the member and platen.

8. The batch former of claim 7 further comprising means for returning the platen and log support member to their initial positions after the grapple removes the logs.

9. The batch former of claim 8 wherein the means for controlling movement of the log support member and platen includes a primary pneumatic cylinder attached to the platen to bias the platen against the member and to resist movement of the platen until a predetermined pressure is achieved by the pusher pushing logs against the end plate of the platen.

10. A method for forming a batch of logs for feeding to wood grinders, comprising the steps of:
(a) forming a batch of logs, including short logs, in a batch former compartment;
(b) partially pushing the logs from the compartment by having at least one log butt against a platen, the batch sliding over a stationary intermediate support before entering the platen;
(c) moving the platen a predetermined distance away from the support;
(d) moving the platen and and support simultaneously while preserving the predetermined distance;
(e) removing the logs from the platen and support with a grapple which includes a tine that fits into a gap between the platen and support, wherein the gap is defined by the predetermined distance.

* * * * *